Figure 2:
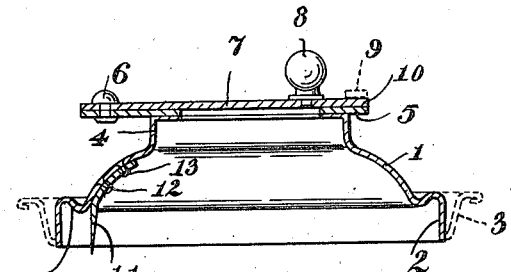

J. F. WRIGHT.
LID FOR SIRUP TINS OR THE LIKE.
APPLICATION FILED DEC. 30, 1919.

1,402,559.

Patented Jan. 3, 1922.

John Frederick Wright
Inventor

By
Attorney

UNITED STATES PATENT OFFICE.

JOHN FREDERICK WRIGHT, OF PRENTON, BIRKENHEAD, ENGLAND.

LID FOR SIRUP TINS OR THE LIKE.

1,402,559.  Specification of Letters Patent.  Patented Jan. 3, 1922.

Application filed December 30, 1919. Serial No. 348,390.

*To all whom it may concern:*

Be it known that I, JOHN FREDERICK WRIGHT, a subject of the King of Great Britain, residing at Prenton, Birkenhead, in the county of Chester and Kingdom of England, have invented certain new and useful Improved Lid for Sirup Tins or the like, of which the following is a specification.

This invention relates to an improved attachment for tins containing liquids, particularly viscous liquids such as sirup, condensed milk, or the like, and it is the object of the invention to provide an improved detachable lid which will enable the material to be removed in a clean and economical manner.

The invention will be described in a preferred form with reference to the accompanying drawings and the scope of novelty will be defined in the appended claims.

In the drawings:—

Figure 1:
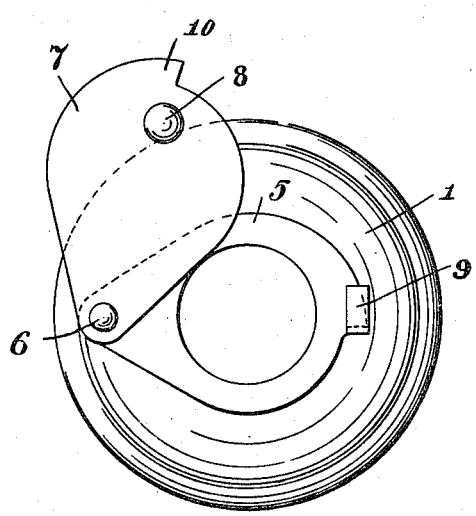

Figure 1 is a plan view, and,

Figure 2 a section through such a device.

1 is a dome-shaped metallic member which may be made of tin or other suitable material. It is provided with a flange 2 which in the case of a condensed milk tin or the like surrounds the upper portion of the outer walls of the tin, which it engages by the external flange 3. In the case of a sirup tin which is provided with a detachable lid, the flange 2 is formed to fit inside the usual top flange of the sirup tin. If desired, the flange 2 may be bevelled internally or externally to fit different sizes of tins.

4 is a short neck carrying a pear-shaped flange 5 on one end of which is fixed a pivot 6 about which rotates the lid 7 having a small handle 8. This lid 7 is arrested by a catch 9 into which fits a short projection 10 mounted on the lid.

The device is used by being attached either internally or externally to a condensed milk or sirup tin, and the liquid is run out through the opening in the neck 4. When sufficient has run out, the lid 7 is slid into the closed position whereupon the flow of liquid is quickly and cleanly cut off.

In using the device for condensed milk tins or the like, it is possible to remove the top of the tin in the usual manner with a tin opener, but I prefer to mount a knife 11 within the dome 1 to which it is secured by rivets 12 and 13. The point of this knife may be made of hardened steel and it projects just below the rim 14 which engages the top of the tin.

I declare that what I claim is:—

1. A detachable lid for tins containing viscous liquids comprising a flanged open-bottomed top adapted to engage the top of the tin removably, a central hollow flat-topped cylinder as a neck thereon from which liquid can be poured, and a flat rotary imperforate disc outside said cylinder so that the underside of the disc is in sliding engagement with the cylinder top, to open or close the opening in said cylinder, whereby the flow of viscous liquid can be sharply cut off.

2. A detachable lid for tins containing viscous liquids comprising a doomed flanged open-bottomed top adapted to engage the top of the tin removably, a central hollow flat-topped cylinder thereon from which liquid can be poured, and a flat rotary imperforate disc outside said cylinder so that the underside of the disc is in sliding engagement with the cylinder top to open or close the openings in said cylinder, the edge of which disc is coincident with the edge of the neck at the point from which liquid is poured, whereby the flow of viscous liquid can be sharply cut off.

In witness whereof, I have hereunto signed my name this 3rd day of December 1919, in the presence of two subscribing witnesses.

JOHN FREDERICK WRIGHT.

Witnesses:
 HAROLD E. POTTS,
 HILDA STIRK.